United States Patent [19]

Stevenson et al.

[11] Patent Number: 5,023,873
[45] Date of Patent: Jun. 11, 1991

[54] METHOD AND APPARATUS FOR COMMUNICATION LINK MANAGEMENT

[75] Inventors: John G. Stevenson; Raymond C. Williams, both of Raleigh, N.C.

[73] Assignee: International Business Machines Corporation, Armonk, N.Y.

[21] Appl. No.: 366,947

[22] Filed: Jun. 15, 1989

[51] Int. Cl.$^5$ ............................................. G06F 11/20
[52] U.S. Cl. ..................................... 371/8.2; 371/20.6
[58] Field of Search .................... 371/8.2, 7, 8.1, 15.1, 371/29.1, 20.1, 20.5, 20.6; 370/13, 17; 375/10; 455/67

[56] References Cited

U.S. PATENT DOCUMENTS

| | | | |
|---|---|---|---|
| 3,920,975 | 11/1975 | Bass | 371/8.2 X |
| 4,922,491 | 5/1990 | Coale | 371/29.1 X |
| 4,937,825 | 6/1990 | Ballard | 371/20.1 |

Primary Examiner—Jerry Smith
Assistant Examiner—Robert W. Beausoliel
Attorney, Agent, or Firm—John J. Timar

[57] ABSTRACT

A communication link manager for problem determination and recovery of a failing resource on a communication link segment in a data communication network. When a problem occurs on a link segment, the using node passes link event data to the communication link manager for analysis. The communication link manager interacts with a configuration data base to determine the physical configuration of the failing link segment and the controlling link connection subsystem manager. The communication link manager directs the appropriate link connection subsystem manager to initiate tests of the various link connection components on the link segment under its control. When the failing resource is identified, the communication link manager initiates the appropriate non-disruptive recovery procedure through the link connection subsystem manager and prompts the data link control to restart the line.

15 Claims, 8 Drawing Sheets

FIG. 5

| CONFIGURATION | LCSM-1 | LCSM-2 | LCSM-3 | LCSM-4 |
|---|---|---|---|---|
| 1 | USING NODE | FELS | | |
| 2 | USING NODE | FELS | STAT MUX | |
| 3 | USING NODE | FELS | TDM | |
| 4 | USING NODE | FELS | STAT MUX | TDM |
| 5 | USING NODE | STAT MUX | | |
| 6 | USING NODE | STAT MUX | TDM | |
| 7 | USING NODE | TDM | | |

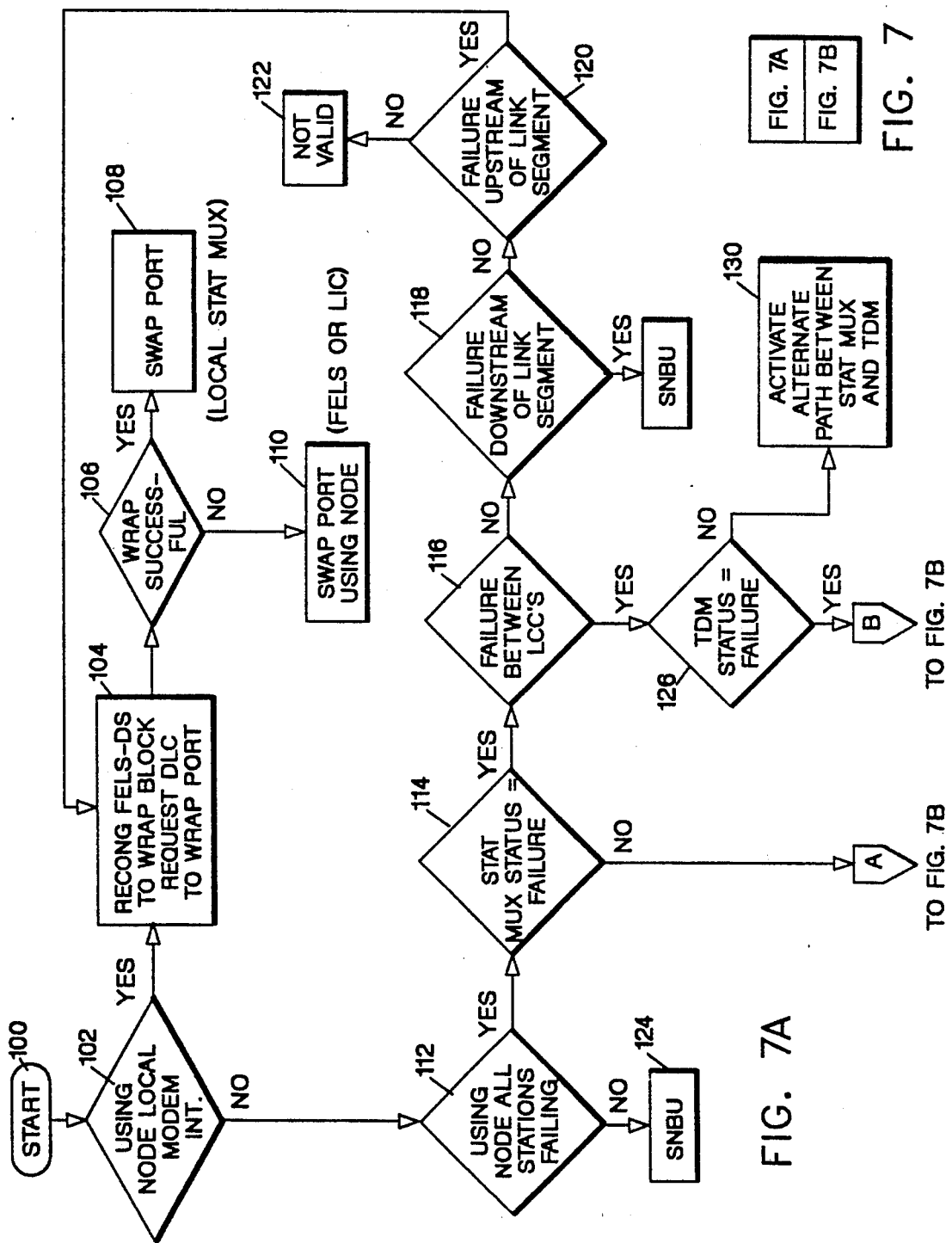

METHOD AND APPARATUS FOR COMMUNICATION LINK MANAGEMENT

REFERENCE TO RELATED APPLICATION

This invention is related to an application filed June 15, 1988, Ser. No. 207,097 now U.S. Pat. No. 4,937,825, having the same assignee.

FIELD OF THE INVENTION

This invention relates to data communication network management apparatus and methods that provide a processing system for automated analysis of communications problems or faults in the communication link resources and non-disruptive recovery.

BACKGROUND OF THE INVENTION

Numerous prior network link management problem diagnosis methods and devices exist in the field. These generally are designed in a manner specific to the particular physical devices that make up the data communication links. In telephone systems in general, loop back signals may be transmitted from a controlling node to the various elements making up the communication link to a target node, and signals may be propagated down the communication link to be looped back by devices in the line which are operating correctly and which can respond to the loop back commands to the control node. Such processes are, however, totally inappropriate when the data communication network devices operate under differing protocols, are supplied by different vendors and have differing diagnostic data providing capabilities.

More sophisticated techniques for problem diagnosis are also in existence where the data communication network contains devices supplied by the vendors of the host data node or control node systems. For example, the IBM Corporation markets components for a data communications system including host system mainframe computers, operator control consoles and communication network control program applications that can communicate with and diagnose problems occurring in a data communication network that includes IBM supplied modems, multiplexers, switches and the like. However, these systems share a common system architecture and communication protocol and are thus amenable to a single diagnostic application program and protocol. They avoid the difficulty encountered as mentioned above, with numerous protocols in numerous physical devices supplied by diverse vendors. Such uniform systems are, however, not often achieved and in many networks constructed by users and purchasers of various components, such uniformity cannot be brought about without major reinvestment.

In the prior art, the recovery process is usually a manual process which is disruptive to the end user. Recovery techniques have required the network operator to manually intervene and circumvent network link problems by switching to back-up components or by using alternate paths through the network with the high overhead costs associated with re-establishing communications between network resources.

Thus, the major problem the users and the purchasers are faced with is that of achieving high availability of these multiple layer, multiple vendor, multiple protocol networks. Once a failure occurs, it takes time for the operator to react to the problem, the end user usually being the first to notice the problem. Once it is determined that a problem does exist, problem determination must be performed to determine which recovery procedure provides the fastest restoration service to the end user.

It is therefore desirable that some method and system apparatus be provided that is capable of accommodating the more usually encountered data communication networks which are constructed of multiple layers of various vendors' physical devices having diverse capabilities and communication protocols.

SUMMARY OF THE INVENTION

It is an object of this invention to provide an improved method and apparatus for non-disruptive problem determination and recovery in data communication networks. In a layered system, the system overhead of session recovery is reduced by performing recovery at the layer where the failure is detected instead of passing the failing indication to a higher layer. The approach is to modify data link control to allow problem determination and recovery to be completed before sending the failing (INOP) notification. If recovery is successful, then no INOP is sent. Instead, an alert is sent indicating that a failure occurred and that recovery was successful.

It is a further object to provide high availability of the network link resources by not terminating sessions between communicating resources for failures that are recoverable.

It is a still further object to provide for complete automation of the problem determination and recovery process for communication link connections.

It is a still further object to provide a problem determination and recovery structure that can be used by multiple products and environments utilizing various network architectures.

It is a still further object to provide an improved diagnostic system in which the communication link manager, having access to data concerning the physical configuration and characteristics of the network components which comprise a link to an identified target node experiencing a problem, issues problem determination requests to an intermediate translation facility which translates these requests for diagnoses into device-specific commands addressed to particular devices in the link and which receive from such devices specific responses which are communicated to the communication link manager for problem resolution and application of the appropriate recovery procedure.

The foregoing and still other objects not specifically enumerated are provided by the present invention in an architecturally designed system utilizing a novel communications technique. The system comprises a communication link manager that is responsible for problem determination and recovery of the link connection subsystem. The data communications system contains an intermediate control and translation facility that receives the problem determination request from the communication link manager. The communication link manager has access to a dynamic physical configuration data base that constitutes a network map and contains information for each link under the communication link manager's responsibility. This data base identifies the salient characteristics for each physical device constituting each communication link within the purview of the communication link manager. These characteristics include the communication protocol requirements, the capabilities and physical location or addresses for each such device, spare resources that are available for automatic recovery and the components of the translation facility responsible for the various link segments. The communication link manager accesses these data files for an identified target node and link in response to a failure indication from a using node. The translation control facility then issues one or more device-specific addressed problem isolation, determination or control commands onto the communication link. It receives device-specific responses from devices which it is capable of accessing utilizing the information from the physical configuration data base. This intermediate translation and control facility, under direction of the communication link manager, may then issue still further commands to specific physical devices until the problem situation has been isolated and identified. This information is communicated back to the communication link manager which responds with a command to the translation facility to initiate recovery using specific procedures and, if necessary, provide information on ports to swap. The translation facility effects the recovery procedure and informs the communication link manager that recovery was successful, or that recovery was attempted but failed. If recovery is successful, an alert is sent to the host indicating that a failure occurred and that recovery was successful.

BRIEF DESCRIPTION OF THE DRAWINGS

This invention will be described with respect to a preferred embodiment thereof which is further illustrated and described in drawings.

FIG. 5 illustrates the various configurations supported by the preferred embodiment of this invention.

FIGS. 7(a) and 7(b) illustrate a flow chart indicating the algorithm for isolating a connection link problem and applying the appropriate recovery procedure for the link configuration depicted in FIG. 6.

DETAILED DESCRIPTION OF THE PREFERRED EMBODIMENT

The present invention provides a method and apparatus for allowing a communication link manager running in a data communication system to provide problem determination and recovery in the physical computer data communications links and connections. The invention is conceptually and schematically illustrated in FIG. 1.

Figure 1:
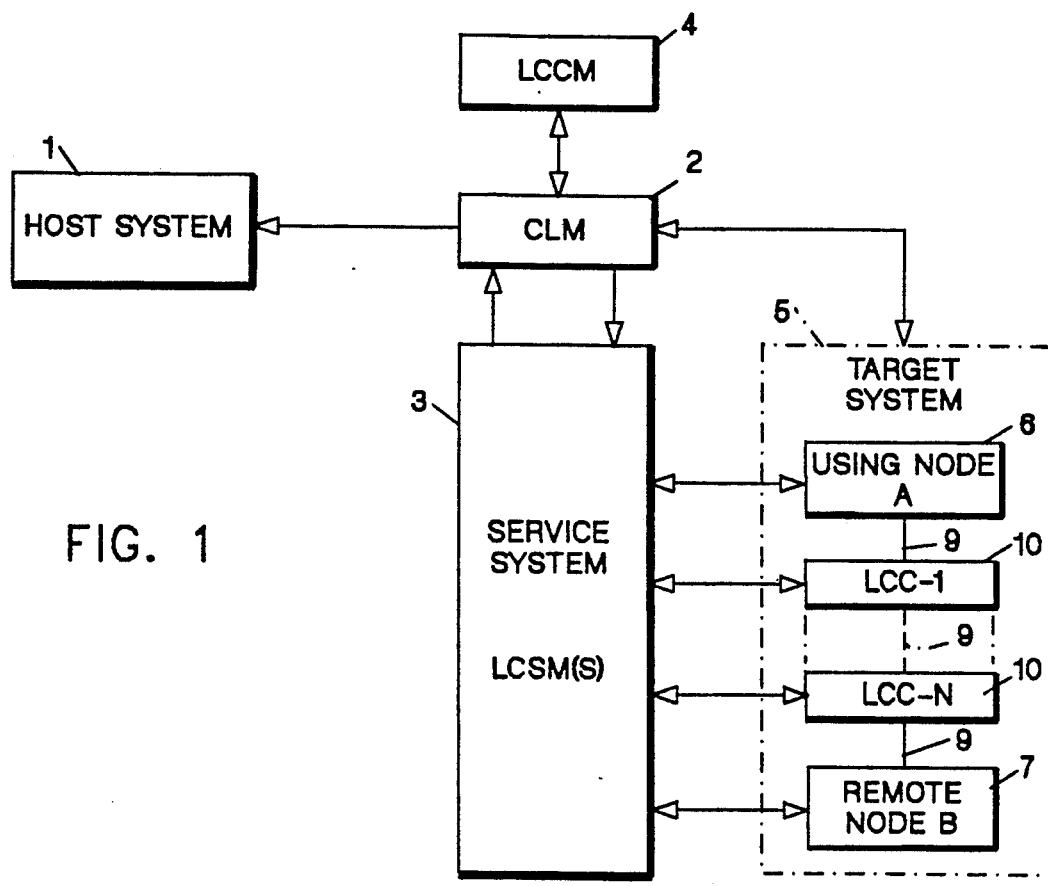
FIG. 1 illustrates a schematic data communication system or network constructed in accordance with the present invention as a preferred embodiment thereof.

The communication link manager (CLM 2) illustrated in FIG. 1 is responsible for problem determination and recovery of the link connection subsystem. The CLM 2 receives input from two logical components of the using node 6, the using node control 22 and the link connection manager 20 as well as from the service system 3 containing the link connection subsystem managers (hereinafter LCSM). The CLM 2 coordinates all problem determination and recovery dealing with the link connection subsystem including the control of multiple LCSMs 3. The CLM 2 obtains complete link connection configuration from the link connection configuration manager (referred to as LCCM 4) including all link connection components (LCCs) 10 in the link connection path, the LCSMs 3 responsible for the components, and the backup components to use if recovery is necessary. The CLM 2 contains unique logic for the different link connection configurations supported.

Figure 1A:
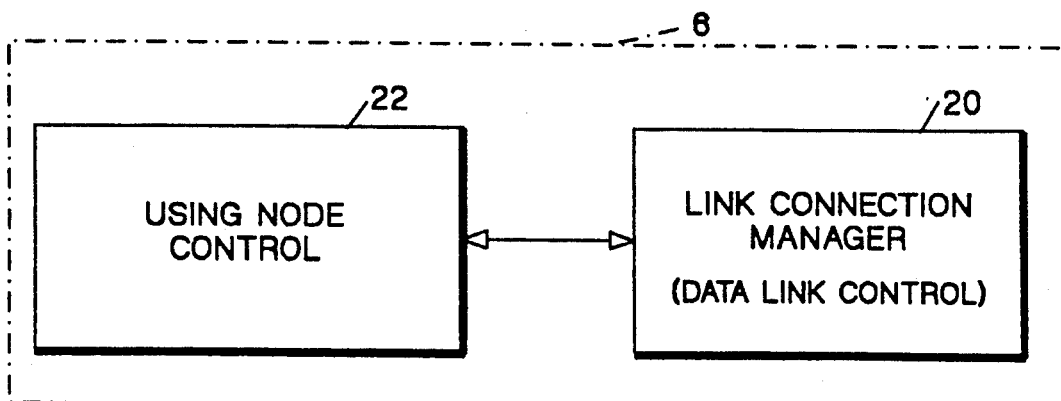
FIG. 1A illustrates the logical structure at the using node as embodied in the present invention.

The using node 6 is responsible for detecting link connection problems. It must determine if the problem is caused by internal hardware or software errors or with the link connection. Using node 6 can be logically decomposed into two functions: a using node control 22 and a link connection manager 20 as shown in FIG. 1A. The link connection manager 20, also referred to as using node data link control, modifies the error recovery procedure for consecutive errors. Three retries are used for each resource that has been active. The link connection manager 20 notifies the communications link manager 2 via using node control 22 whether all active resources or just one resource is failing. It also provides link connection notification to CLM 2 when a resource becomes active. This notification includes the entry and exit addresses and path information if appropriate. This allows dynamic configuration changes to be reflected in the configuration data base 4. The link connection manager 20 is responsible for problem isolation of the link connection entry point. It is also responsible for passing link event data to the communications link manager 2 via using node control 22 when the problem is with the link connection.

The using node control 22 analyzes using node 6 error conditions and passes them on to the CLM 2 for automatic recovery. It also is responsible for passing link connection manager 20 link event conditions to CLM 2 for analysis and automatic recovery.

The link connection configuration manager (LCCM) maintains the current status of each resource. The LCCM 4 is responsible for complete link subsystem configuration data. This includes all link connection components 10 in the link connection path, the way these components are physically connected, the LCSMs 3 responsible for the components and the backup components to use if recovery from failure is necessary.

The link connection components (LCCs) 10 perform the physical functions of the link segment such as statistical multiplexing, time division multiplexing, modems, front end line switches, local area networks, etc. The LCC 10 has two functions to perform in the event of a problem. The first is to determine if the problem is caused by an internal error or with the link segment. If the problem is internal, the LCC 10 passes this information to the appropriate LCSM 3. If the error is with the link segment, the LCC 10 collects the link event data and passes this data to the LCSM 3. The LCCs 10 also provide a data wrap of each interface. For example, if the modems use the same techniques to transmit and receive data, then the transmit data could be wrapped to the receive data for a particular modem.

The first major function of the CLM 2 is problem determination. It receives product error data and link event data from using node 6, requests configuration data and component backup information from the configuration data base 4, selects appropriate problem determination logic depending on the configuration returned from the LCCM 4, invokes the appropriate LCSM 3, examines results from application analysis, determines if other applications (i.e., LCSMs) should be invoked, and initiates the recovery function which is the other major function of CLM 2. The CLM 2 receives requests for recovery action with the failing component identified, determines if a recovery action is defined and invokes an appropriate recovery action, i.e., swap modem, swap port, switch network backup, etc.

The CLM 2 selects the appropriate recovery action logic depending on the identity of the failing component. If recovery is successful, the CLM 2 notifies using node data link control 20 to restart and sends a notification to the host system 1 identifying the defective component. The CLM 2 updates the LCCM 4 with any changes. This includes flagging defective components, removing backup components from the backup pool, and adding backup components to the path. If recovery is unsuccessful, or if no recovery action is defined, the CLM 2 sends an alert to the host system 1 indicating that recovery was attempted but failed, and notifies data link control 20 to send an INOP notification.

Service system 3 provides an intermediate control and translation facility and will generally be in the form of a program which is executed to provide specific diagnostic processes. The service system is comprised of one or more link connection subsystem managers (LCSMs). Each LCSM 3 is responsible for a specific link segment of the link connection subsystem. It sends commands to the link connection component 10 and receives both solicited and unsolicited responses. Each LCSM 3 is capable of managing its link segment independently of any other LCSM. When commanded by CLM 2, the service system 3 generates device-specific requests and inquiries into the various link connection components (LCCs) 10 and logical links 9 which comprise target system 5 in FIG. 1. A particular using node A is identified as numeral 6 within the overall communications link which links the using node 6 with a target station 7. Overall, the node 6, the station 7 and the interconnecting communication components 10 and links 9 may be comprised of any components and constitute a "target system" for which automatic problem diagnosis and non-disruptive recovery is desired in the context of the present invention.

FIG. 1 illustrates the basic scheme, architectural design and logical flow of the preferred embodiment of the invention. In general, communication link manager 2 needs to be able to send diagnostic requests to and receive responses from the intermediate translation and control facility to get information about the logical link connections. In the invention, the CLM 2 accesses the configuration data base 4 to determine the present physical configuration of the specific link to the target system node or station for which problem determination is required. The CLM 2 armed with device-specific data and the physical network configuration and interconnection identifications showing the physical components making up a given communications link issues problem determination requests to LCSM 3. LCSM 3 is then enabled to issue device-specific commands to the LCCs making up the given link for which problem determination is required. The LCSM 3 generates appropriate device-specific diagnostic and control commands to be sent to the physical target system devices to analyze their condition and to analyze the data responses returned from the LCCs 10. The LCSM 3 relays device-specific replies to CLM 2 which, in turn, generates either additional inquiries or the appropriate recovery procedure to the LCSM 3. After the recovery action is completed, CLM 2 directs the using node data link control 20 to restart the application and notifies the host 1 of the problem and successful recovery.

As alluded to earlier, target system link connections may be made up of multiple layers herein called link subsystems comprising various types of physical devices, device capabilities, and communication protocols all of which are usually provided by diverse vendors. As information and data communication networks of the type shown in FIG. 1 are constructed by users, they generally grow to support multiple protocols including IBM system standard SNA and non-SNA protocols. The systems usually contain multiple logical networks and may incorporate one or more physical networks. The data communications networks so constructed not only provide for the transportation of data in the normal systems today, but they may also include analog or voice information which has been suitably digitized for communications and control purposes. These factors all compound the problem of diagnosis for any specific problem isolation in the network, and particularly for isolating faulty components in a given link.

Management of the link connection requires its own hierarchical structure for commands and data flow. The physical link connection components 10 are the LCCs, LCC-1 through LCC-N shown in FIG. 1. Together the LCCs form physical link segments 9 between each LCC and the next LCC, node or station. The segments 9 provide the overall physical link connection between a using node 6 and a remote node 7. The logical SNA view of the link does not always reflect the fact that physical and hierarchical structural changes may occur or that various physical devices actually exist to make up the physical link segments 9.

The actual physical link is the connection or components that a user has assembled forming the logical link between two stations 6 and 7. In FIG. 1, using node A and remote node B could be SNA or non-SNA nodes. Both node A and node B contain a station that wishes to communicate with the other station through the physical link connection. The link connection is composed of some arbitrary number of physical connection components. Each of the physical components 10 is referred to as a link connection component LCC. Each LCC receives signals on its physical interconnection to the link and then passes them to another LCC or eventually to a node. The LCC is the smallest addressable element in the link connection. It can sometimes be addressed through a data link protocol of general usage or may require a specialized format. The addressability allows the LCSM 3 to address each LCC 10 using the correct protocol and physical capabilities that have been passed to it by CLM 2 from the data stored in the LCCM 4. The LCSM may then send request for data to specific LCCs 10 in a format or protocol understandable to them. The LCSM 3 then receives the responses from the LCCs 10 and interprets them.

The communication path segment connecting two LCCs 10 is identified as a link segment 9 in FIG. 1. Each link segment 9 is a portion of a communication path that may include copper wire, coaxial cable, optical fiber, microwave links or other satellite or radio communication components. In addition, a link segment 9 may contain other LCCs 10 and other link segments 9. The definition thus given is generic. Each LCC reports to an assigned link connection subsystem manager, LCSM 3. A LCSM 3 is thus responsible for one or more specific LCCs and the link segments between them. A LCSM 3 may address its assigned collection of link connection components 10 and is responsible for the management of the components themselves. The collection of components addressed by a LCSM 3 is referred to as the link subsystem for logical analysis.

A typical using node 6 as shown in FIG. 1 may be a communications controller or a communications system having an integrated communications adapter. Either type of device incorporates program controlled self-diagnostic capabilities for determining whether the node itself is the cause of a problem or whether the problem is in the communications link attached to it. The node 6 is assigned the responsibility for detecting link connection problems. This is usually accomplished by inference from the nodes' inability to send or receive, or by the detection of an extensive number of retransmissions being required on that link. The using node 6 has two functions to perform in the event that a problem is detected. First, node 6 must perform an elementary probable cause analysis of each problem to determine whether the problem is due to a failure in the node itself or whether it lies in the link connection. When a failure is discovered within a node itself, the node runs its own internal diagnostic routines to isolate the problem for reporting the problem. An improperly functioning communications adapter, i.e., a line driver, internal modem or the like, might be found in such a test. When the problem is not within the node 6 itself, it is assumed to lie somewhere within the link connection components attached to the node. The node then reports this link connection failure to the communication link manager, CLM 2. An IBM 3725 communications controller is a typical example of a system that is capable of diagnosing faults in itself or identifying that the fault is not within itself but within the communication link connection instead. These devices have the capability of reporting an error condition to CLM 2 together with any associated data that is normally maintained such as traffic counts, error counts and adapter interface status conditions that may be reported.

It is the responsibility of CLM 2 when notified of a problem by using node 6, to determine the communications link connection configuration for the link between node 6 and node 7 as shown in FIG. 1. This information will be obtained from the LCCM 4 as will be described below.

The LCSM 3 is responsible for managing its assigned link subsystem. It receives notification of potential problems from the CLM 2. The LCSM 3 is the component in the system that must send commands to the LCCs 10 and which receives their responses for forwarding on to CLM 2. The LCSM obtains from the CLM 2 the present connection configuration identifying the elements in the given communication link together with the addresses of the individual LCCs 10 with which it will communicate. Neither CLM 2 nor LCSM 3 contains the configuration map of the entire link connection.

The LCSM 3 receives commands or inquiries from and responds to requests to be performed from the CLM 2 in the form of generic requests. The requests from the CLM 2 are directed to a given LCSM in response to indications of a problem being reported by a given node 6. The CLM 2 will determine which LCSM 3 has been assigned the management function for determining problems within the identified links connected to the node 6. The CLM 2 issues problem determination requests to the LCSM 3 that is assigned to manage a given communications link and will identify the target node 7 for problem determination.

The CLM 2 provides LCSM 3 with information derived from LCCM 4 on the communications link configurations and addresses of devices constituting the link. The LCSM 3 is also provided with the appropriate protocol or communication method for each identified specific LCC 10. The LCSM 3 then generates a series of inquiries to implement testing of the communication link between nodes 6 and 7 by issuing diagnostic commands to the individual LCCs 10. LCSM 3 will eventually report back to the CLM 2 that a failure has been detected and isolated to a specific LCC 10, that a failure has been detected but not isolated to a specific component, or that no trouble has been found on the link.

If LCSM 3 isolates the problem, it will send a response to CLM 2 indicating the specific LCC 10 or connection to a specific component which is the source of the problem. Because of its limited capabilities, the LCSM 3 does not determine the probable causes of error for the entire link connection that may exist but only for its own assigned LCCs 10. Other LCSMs may also be involved in determining probable cause error conditions for still other LCCs in a given communications link between two nodes. The CLM 2 must be able to send requests for tests to multiple LCSMs 3 in such a system configuration in order to determine fully what problem is occurring and which element is responsible.

The LCCs 10 typically may be protocol converters, computerized branch exchanges, time division multiplexers, modems, statistical multiplexers, front end line switches, local area network controllers and the like. Each link connection component 10 will perform specific functions that it is capable of carrying out at the physical link layer that it represents. These functions include digital to analog signal conversion, typically performed by modems; line multiplexing, normally performed by multiplexers or some switching systems; and other functions that affect the physical data transmission layer. Each LCC 10 monitors its own operational condition for its own link segment. At the occurrence of failures, the LCC 10 affected may initiate various tests to determine the causes of failure. A given LCC 10 may attempt a recovery action when a problem is detected by initiating internal self test and/or by notifying its neighbors of a problem. The LCC 10 may participate with its neighbors in problem determination procedures which may include performing wrap tests or line analysis tests such as those carried out typically by some "intelligent" modems. Each LCC 10 must be able to execute and respond to diagnostic commands received from its assigned managing LCSM 3. The commands may cause functions to be performed such as self-testing, status checking at interfaces, and collection of various operating parameter settings for the individual devices. The specific commands that may be received from the LCSM 3 will necessarily be in the proper format and/or protocol required by the LCC 10. Since various LCCs have differing capabilities and may implement different command functions and responses, the physical configuration of the individual links between nodes served by a given LCSM 3 are maintained in the LCCM 4.

Summarizing the operation of the overall system design just discussed, it may be seen that the structure as described in FIG. 1 exists conceptually for each link connection. At a system level, however, the CLM 2 incorporates processes that enable it to handle problem determination and non-disruptive recovery for all segments of all the link connections incorporated within a link subsystem or target subsystem between a using node 6 and a remote node 7 as shown in FIG. 1. This type of design allows the CLM 2 and LCSMs 3 to be developed to support any type of communications protocol or command environment, thus either SNA or non-SNA link connection components may be accommodated easily. The information that flows between the CLM 2 and both the LCCM 4 and the LCSMs 3 is designed to provide a generic support capability that allows any type of product LCC 10 to be supported. Any product unique command, protocols or requirements are generated by the LCSM 3 in response to the information it receives from CLM 2 regarding the physical configuration of the link from the LCCM 4. All of the necessary problem determination and recovery processes are controlled by the CLM 2, which directs the LCSM 3 to perform a sequential series of analyses on each LCC 10 until the problem is isolated and identified, at which time CLM 2 initiates a selected recovery procedure via the appropriate LCSM 3.

Each of the LCCs 10 must be addressable from the corresponding LCSM 3 in order to receive commands, execute tests, gather data or transmit information. The way in which this is accomplished depends upon many factors including the location of the LCSM 3 relative to the given LCC 10 in the network, the type of communication path available for communication, and the type of data link control protocol that is utilized. The many differences in the communication factors mentioned for each LCSM 3 make it unlikely that a single addressing structure for all LCCs 10 may be implemented. However, within the link connection subsystem which exists for a given target system between nodes 6 and 7, there should be a consistent means of alerting the host system 1 of the conditions of all the LCCs that comprise the link. This is accomplished by this invention which is capable of sending to the host system 1 the present physical connections making up the link together with generic responses identifying which element or elements have been isolated as being the source of the problem.

Figure 2:
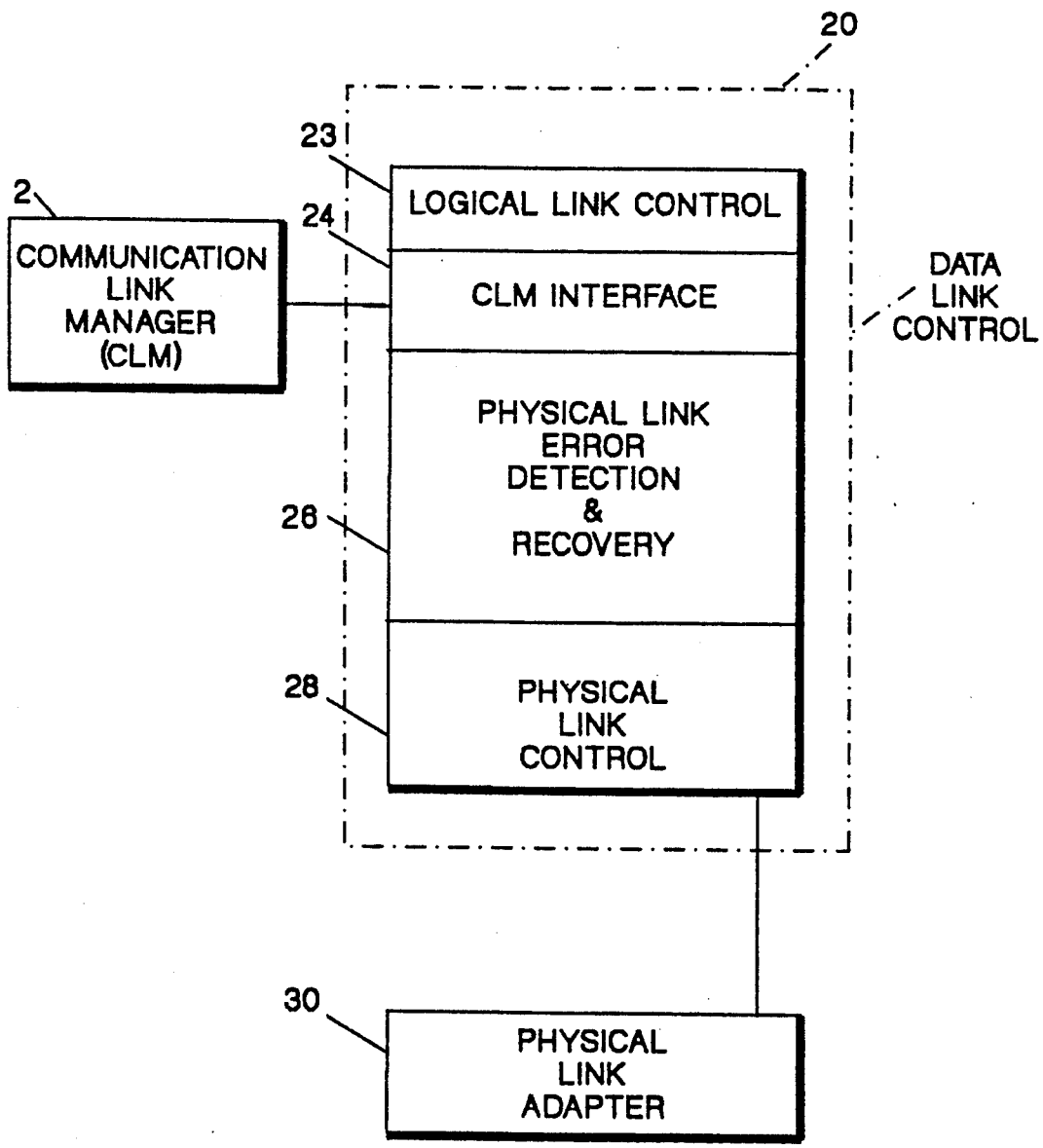
FIG. 2 illustrates the structure of the using node link connection manager, also referred to as data link control, and the interface between the communication link manager and the using node in the present invention.

Illustrated in FIG. 2 are the different functional layers comprising data link control 20 (i.e., link connection manager of FIG. 1A) at the using node 6. Logical Link Control 23 provides the logical appearance of the link to the host. For example, in SNA a link will have a logical name that maps to a Network Addressable Unit (NAU) which is the SNA logical address for the link. Inserted in data link control 20 between the logical link control layer 23 and the physical link control layer 28 are the physical link error detection and recovery layer 26 and the CLM interface 24. Physical Link Error Detection & Recovery 26 is responsible for detecting errors on the physical link and performing recovery for the specific error until a predetermined threshold is exceeded. CLM Interface 24 allows data link control to pass control to a higher level (CLM 2) when the predetermined Physical Link Error Recovery threshold has been exceeded. The CLM interface 24 interrupts data link control 20 without the communication sessions between using node 6 and remote node 7 going down. Thus, the failure is automatically bypassed while recovery is attempted.

Figure 3:
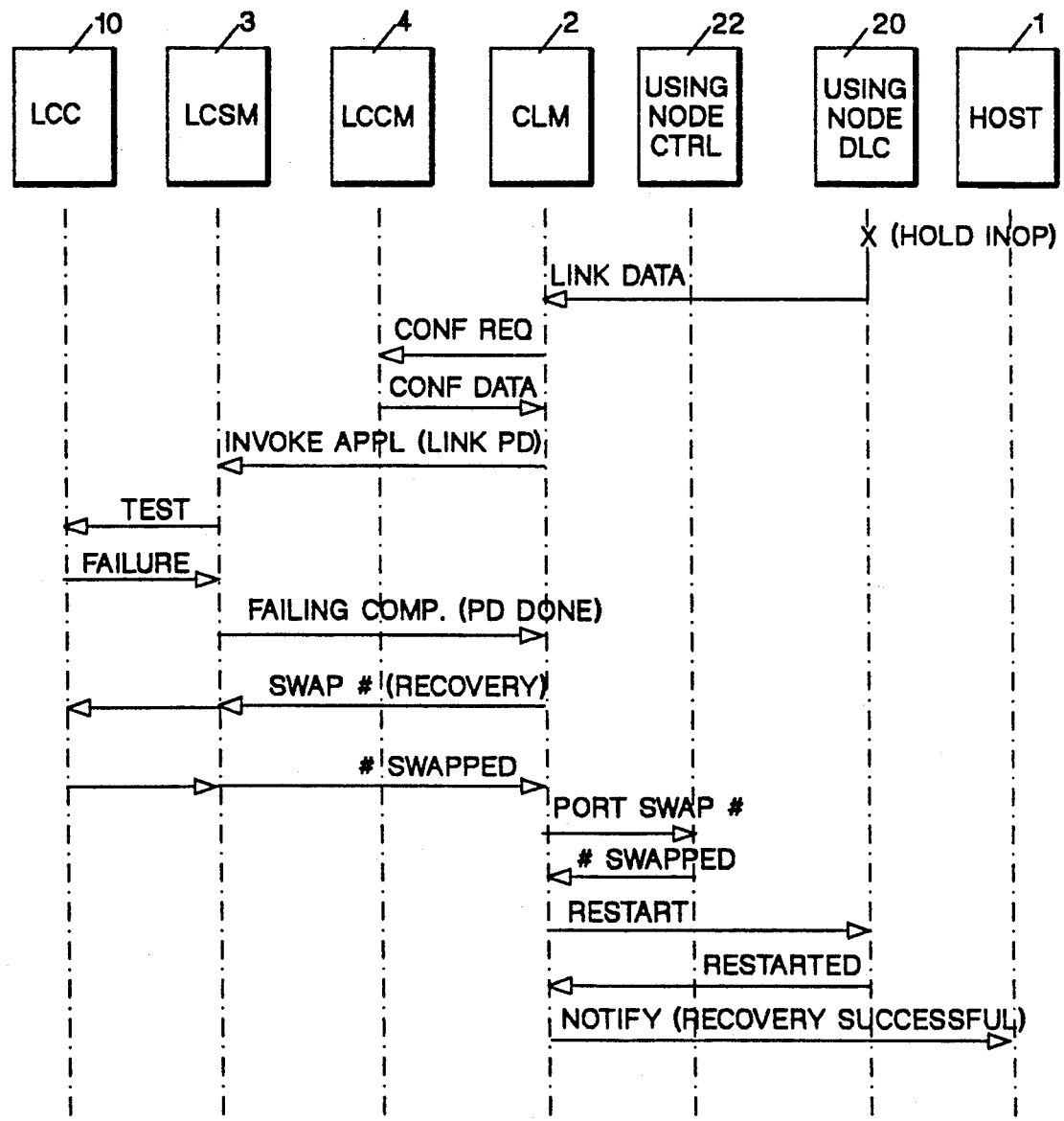
FIG. 3 is an automatic problem determination and recovery flow chart showing how the communication link manager conducts the diagnostic processes and communicates with various link components through a link connection subsystem manager to effect the recovery of failed link components.

FIG. 3 illustrates an automatic problem determination and recovery flow chart showing how the communication link manager 2 conducts the diagnostic processes and communicates with the LCSMs 3 to coordinate recovery of the failed link components 10. The using node DLC 20 detects link connection problems and first determines if the problem is with a node itself or with the link connection. In the latter case, the using node DLC 20 passes link event data to the CLM 2 and holds the INOP signal. Upon receiving the link event data, the CLM 2 requests configuration data from LCCM 4 which provides CLM 2 with the complete link subsystem configuration data, including all LCCs 10 in the link connection path, the LCSM 3 responsible for specific segments of the link, and the backup components for recovery.

The CLM 2 then initiates link problem determination by selecting the appropriate problem determination logic depending on the configuration returned from LCCM 4 and invokes the appropriate LCSM 3 for application analysis. LCSM 3 then tests the specific link segment of the link connection subsystem for which it is responsible. The LCCs 10 in the link segment determine if a problem is caused by an internal error or with the link segment. If the problem is internal, the LCC 10 passes this information to LCSM 3. If the error is with the link segment, the LCC 10 collects the link event data and passes this data to LCSM 3.

Having received the failure data from an LCC 10, the LCSM 3 sends a response to CLM 2 identifying the failed component. This completes the problem determination stage. With knowledge of both the link configuration and the failed component, the CLM 2 sends a request to the LCSM 3 to initiate a specific recovery action (e.g., swap ports). LCSM 3 then sends a command to the appropriate LCC 10 to execute the recovery action. After the procedure is completed, LCC 10 notifies LCSM 3 which, in turn, signals CLM 2 that recovery is complete. CLM 2 next informs using node control 22 of the port swap and receives an acknowledgement in return. CLM then directs the using node data link control 20 to restart the link. Using node DLC 20 advises CLM 2 when restart has been completed. Finally, CLM 2 sends a notification to the host system 1 that a failure has occurred and that recovery has been successful.

Figure 4:
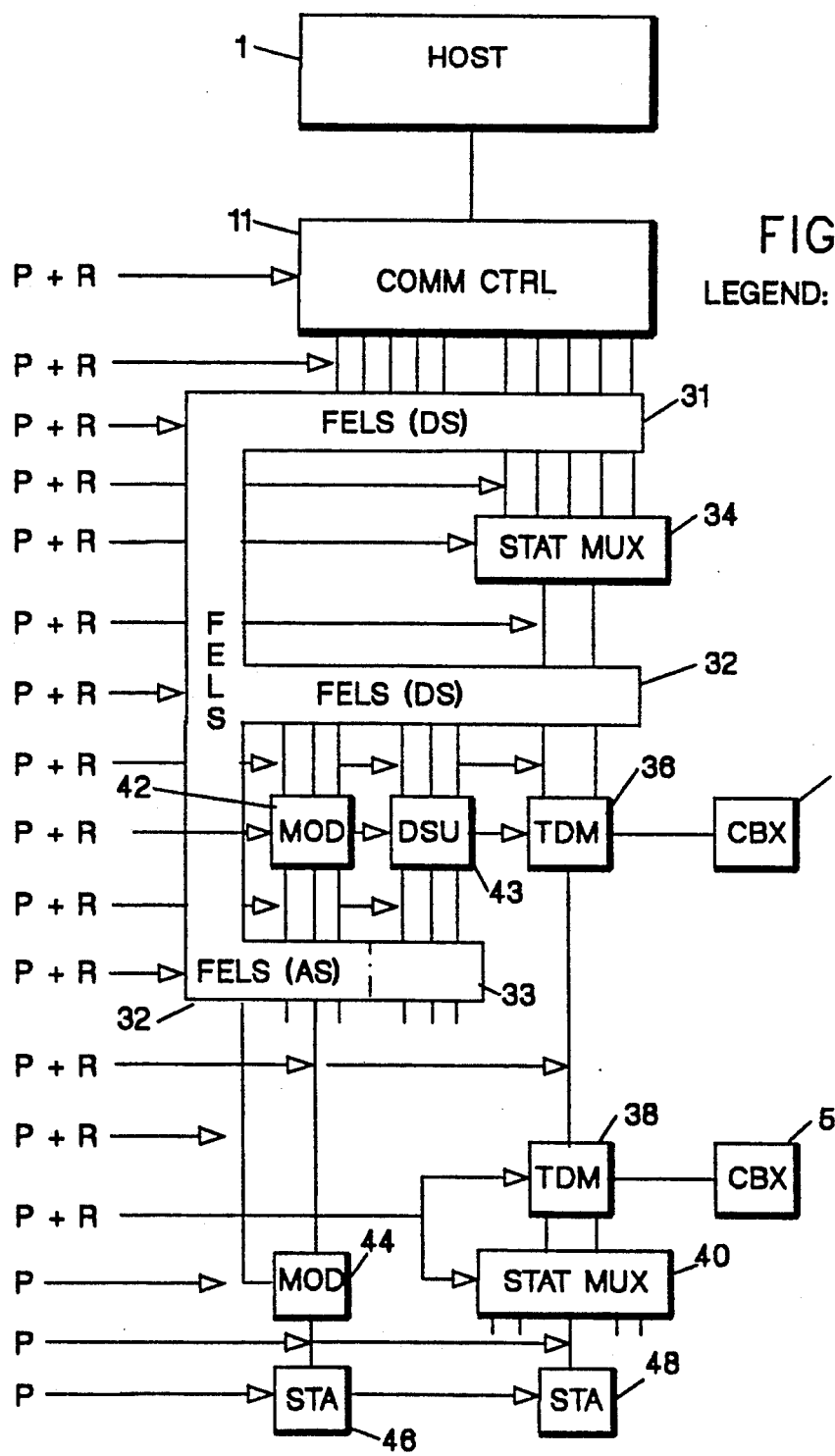
FIG. 4 illustrates a general communications network and indicates the link connection components which can be subjected to automatic recovery procedures.

Illustrated in FIG. 4 are some typical link connection components of a computer network which were referred to previously in a generic sense as LCCs 10 in FIG. 1. Also shown are the connecting links which physically connect the various LCCs and which were identified by reference numeral 9 in FIG. 1. The network has a host system 1 connected to a communications controller 11 which may contain the using node 6. Connected to the communications controller 11 is digital front end line switch 31 (FELS(DS)). The output of front end line switch 31 is connected to statistical multiplexer (STAT MUX) 34 whose output ports are connected to digital front end line switch 32. The output ports from FELS(DS) 32 are shown connected to modem 42, data service unit (DSU) 43, and time division multiplexer (TDM) 36. The outputs from modem 42 and DSU 43 are routed to analog front end line switch 33 (FELS(AS)) for transmission over a line to modem 44 which passes the received data on to station 46. The output side of TDM 36 is routed via a T1 line to TDM 38 whose output is passed to station 48 via statistical multiplexer 40. Also shown in FIG. 4 are two computerized branch exchanges (CBX) 52, 54 linked to TDMs 36 and 38 respectively. The links and link connection components for which recovery from a failure is possible are indicated by the P+R label and arrow drawn to the link or component. The label P indicates that problem determination is possible but not automatic recovery from failure. This latter situation applies to modems, links and stations at the remote location.

Figure 6:
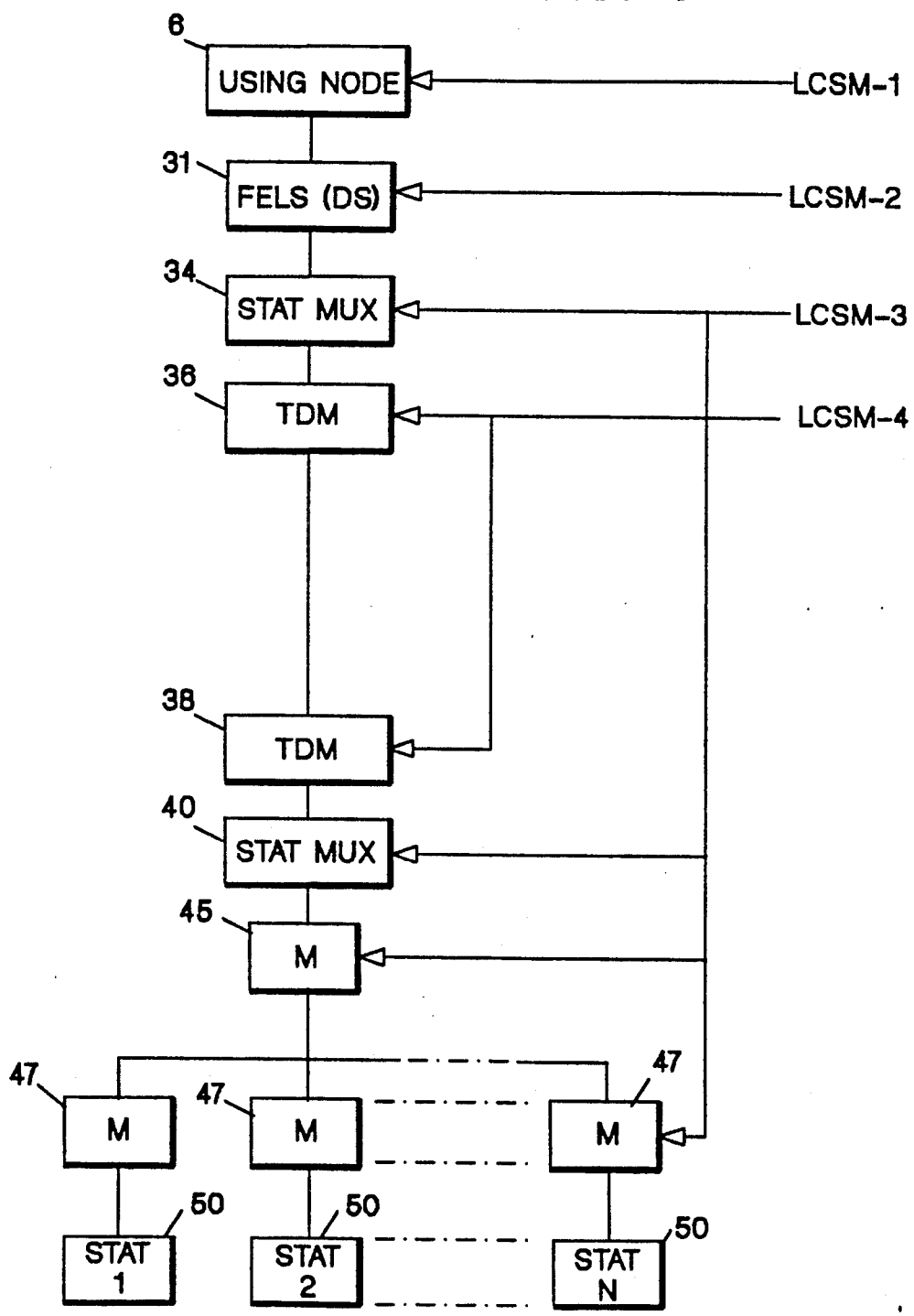
FIG. 6 illustrates an example configuration supported by the preferred embodiment of this invention.

The different configurations of devices supported by this invention are indicated in FIG. 5. The column headings identify the LCSM 3 having responsibility for the particular LCC 10. For example, configuration 4 includes a using node which is managed by LCSM-1, a front end line switch managed by LCSM-2, a pair of statistical multiplexers managed by LCSM-3 and a pair of time division multiplexers managed by LCSM-4. The actual physical layout corresponding to this particular configuration is illustrated in FIG. 6. The LCSM responsible for the statistical multiplexers, i.e., LCSM-3, is also responsible for problem isolation of the modems 45, 47 downstream from the STAT MUX 40. This is true in general, and in configurations having TDMs but not having STAT M0Xs, such as configurations 3 and 7 in FIG. 5, the LCSM responsible for the TDM is also responsible for problem isolation of the modems downstream from the TDM. in the absence of either STAT MUXs or TDMs, the using node 6 will be responsible for problem isolation of modems.

In FIG. 6, LCSM-2 is responsible for problem isolation of the path between its link segment entry and exit points. The entry point is the input port to FELS 31; the exit point is the output port from FELS 31. However, LCSM-2 is not responsible for problem isolation of the modems, TDMs, or STAT MUXs on the path attached to the FELS 31.

LCSM-3 is responsible for problem isolation of the path between the link segment entry point at the input port on STAT MUX 34 to the link segment exit point at the output port on STAT MUX 40. LCSM-3 is also responsible for problem isolation of the modems 45, 47 downstream from STAT MUX 40. However, LCSM-3 is not responsible for problem isolation of the TDMs 36, 38 located between STAT MUXs 34 and 40.

LCSM-4 is responsible for problem isolation of path between the link segment entry point at the input port on TDM 36 to the link segment exit point at the output port on TDM 38.

For each supported configuration, there is an algorithm which is used by CLM 2 to isolate and resolve the link problem. The algorithm corresponding to the physical layout depicted in FIG. 6 is provided by the logic chart of FIGS. 7A and 7B. The other algorithms are similar in structure and one skilled in the art could easily derive them from the framework depicted in FIGS. 7A and 7B which illustrate the most complex configuration among the ones supported.

Once a problem has been isolated, CLM 2 invokes the appropriate recovery procedure to recover from the problem. If recovery is successful, CLM 2 notifies the host that a failure was detected and that recovery was successful. The failing component is identified and the configuration data base (LCCM 4) is updated to reflect the current configuration. If recovery is not successful, the CLM 2 notifies DLC 20 to INOP the resource and sends notification to the host 1 indicating the failing resource and that recovery was attempted but failed.

Figure 7B:
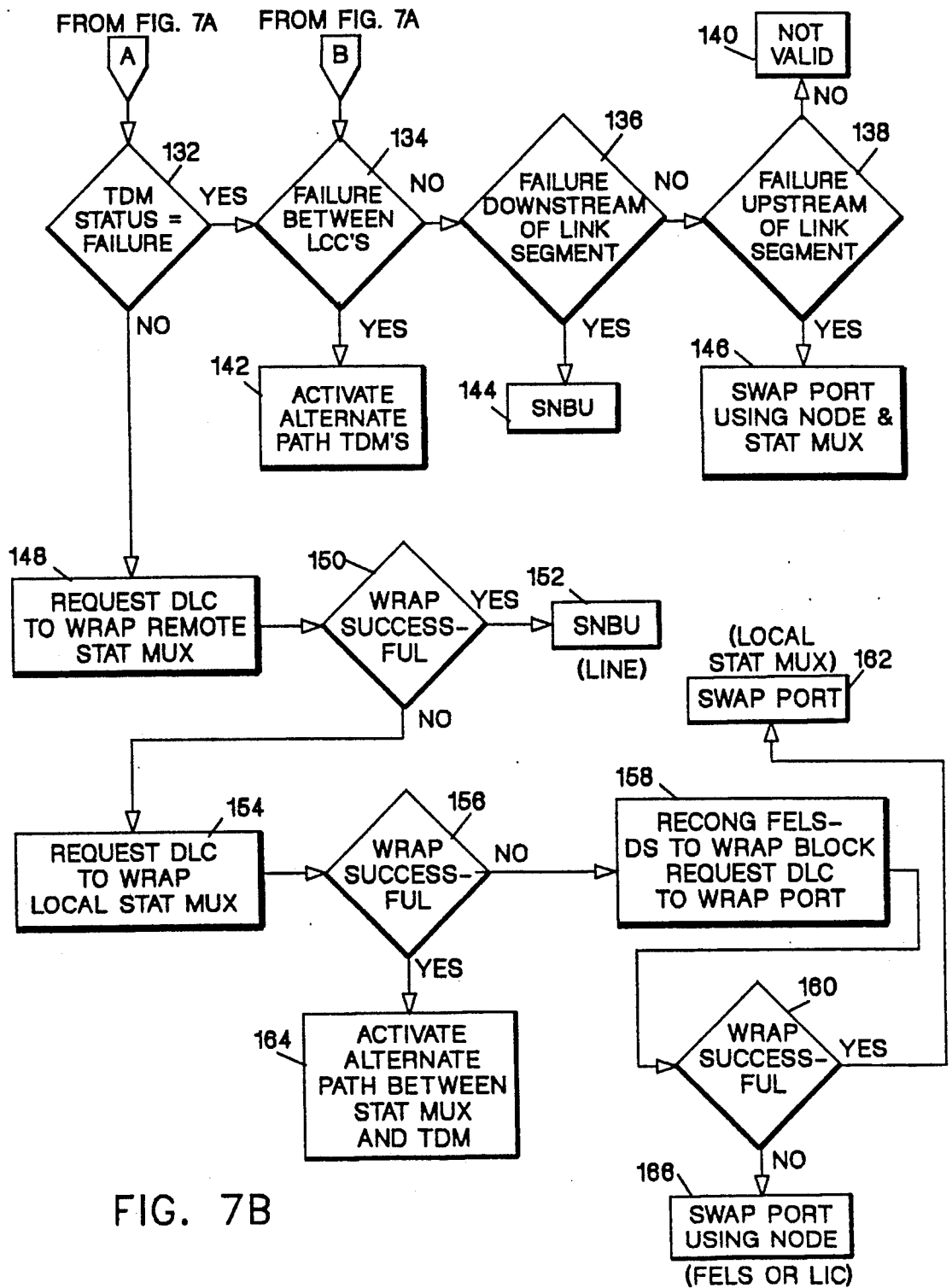

Referring now to FIGS. 7A and 7B, the first logical test as indicated by block 102 is to determine if there is a problem at the using node - local modem interface. If there is, the digital front end line switch 31 is reconfigured to perform a wrap test. The data link control 20 is requested to wrap the port on the FELS 31. The wrap test is performed next as indicated in logic block 106.

If the wrap test in logic block 106 is successful, the problem has been narrowed to the local statistical multiplexer 34, and the appropriate recovery procedure is to swap the identified port as indicated in block 108. The recovery function of CLM 2 determines the actual ports that have to be swapped from the configuration data base maintained by LCCM 4 and which port to use as a spare. When the CLM 2 receives a response from the FELS application 31 that the digital switching is complete and from the STAT MUX application 34 that the port was swapped, it notifies DLC 20 to restart the line.

If the wrap test in block 106 is not successful, the problem has been narrowed to either the FELS or line interface control (LIC) from communications controller 11, and the appropriate recovery procedure is to swap the identified ports between the FELS 31 and communications controller 11. The CLM 2 determines the actual ports to be swapped from the configuration data base maintained by LCCM 4 and which port to use as a spare. When the CLM 2 receives a response from the FELS application 31 that the digital switching is complete and that the port has been swapped, it notifies data link control 20 to restart the line. If in block 102 the using node - local modem interface is not failing, the link connection between the using node and the remote stations is checked to determine if a single station or if all stations are failing. If the logic test indicated by block 112 indicates that only a single station is failing, the CLM 2 will determine the actual ports that have to be used from the configuration data base maintained by LCCM 4 and the phone numbers to use for switched network backup (SNBU). The CLM 2 notifies the STAT MUX application to dial and restart the line. If in logic block 112 there is an indication that all stations are failing, the next test is performed in logic block 114 to determine the status of the STAT MUXs. If the result of the logic test in block 114 is that there is a failure on the link segment containing the STAT MUXs, a series of tests is performed to determine if the failure is between the STAT MUXs (logic block 116), if the failure is downstream of the link segment (logic block 118), or if the failure is upstream of the link segment (logic block 120).

If in logic block 118 the failure is determined to be downstream of the STAT MUXs, the CLM 2 uses remote switched network backup (SNBU) to recover from the failure. If in logic block 120 the failure is found to be upstream of the link segment between STAT MUX 34 and STAT MUX 40, the problem is with either the local STAT MUX 34, front end line switch 31 or line interface control. The problem is isolated by reconfiguring the FELS 31 to do a wrap test and requesting data link control 20 to wrap the port on the FELS 31. If the wrap is successful, the port is swapped on the local STAT MUX 34. Otherwise, the port on using node 6 is swapped.

If the STAT MUX test performed in logic block 114 indicates no failure, then the TDMs are tested as shown in logic block 132 in FIG. 7B. Logic block 126 also tests the status of the TDMs. If in either logic block 126 or logic block 132, the status of the TDMs is failure, then CLM 2 tries to ascertain if the failure is between TDM 36 and TDM 38 (logic block 134), downstream of the link segment between the TDMs (logic block 136) or upstream of the link segment between TDMs (logic block 138).

If in block 134 the failure is identified as being on the link segment between the TDMs, then the appropriate recovery procedure is to activate an alternate path between the TDMs. The CLM 2 determines the actual ports to use. If in block 136 the failure is determined to be downstream of the link segment between the TDMs, CLM 2 uses remote switched network backup (SNBU) to attempt to recover from this failure. If in block 138 the failure is determined to be upstream of the link segment between the TDMs, CLM 2 swaps ports between the using node and STAT MUX. The CLM 2 determines the actual ports to swap from the configuration data base 4. When the CLM 2 receives a response from the STAT MUX application that the ports were swapped, it notifies DLC 20 to restart the line.

If the TDM status test in block 126 indicates that the TDMs have not failed, the appropriate recovery procedure is to activate an alternate path between the STAT MUXs and the TDMs. The CLM 2 determines the actual ports to swap from the configuration data base maintained by LCCM 4.

If the TDM status test in block 132 indicates that the TDMs have not failed, then CLM 2 requests DLC 20 to wrap the remote STAT MUX 40 as indicated in logic block 148. If the wrap test performed in block 150 on the remote STAT MUX 40 is successul, the appropriate recovery action is to use remote switched network backup (SNBU) to recover from the failure. The CLM 2 determines the actual ports to use and the phone numbers to use for SNBU. It notifies the STAT MUX application to dial and restart the line.

If the wrap test on the remote STAT MUX is not successful, then CLM 2 requests DLC 20 to wrap the local STAT MUX 34 as indicated in logic block 154. If the wrap test performed on the local STAT MUX is successful (logic block 156), the problem is between the local and remote STAT M0Xs and the appropriate recovery procedure is to activate an alternate path between the STAT MUXs and TDMs. The CLM 2 determines the actual ports to use from the configuration data base maintained by LCCM 4. If the wrap test performed on the local STAT MUX 34 is not successful, then CLM 2 reconfigures the front end line switch 31 to perform a wrap test. CLM 2 requests a DLC 20 to wrap front end line switch 31. If in block 160 the wrap test on the front end line switch 31 is successful, the problem is with the local STAT MUX 34 and the appropriate recovery procedure is to swap port on local STAT MUX 34. The CLM 2 determines the actual ports to swap from the configuration data base 4. When the CLM 2 receives a response from the FELS application that the digital switching is complete and from the STAT MUX application that the port has been swapped, it notifies DLC 20 to restart the line. On the other hand, if the wrap test on the front end line switch in block 160 is unsuccessful, the problem is with FELS 31 or the line interface control. The appropriate recovery procedure is to swap the port on the using node. The CLM 2 determines the actual ports to swap from the configuration data base maintained by LCCM 4. When the CLM 2 receives a response from the FELS application that digital switching is complete and that the port has been swapped, it notifies DLC 20 to restart the line.

While the invention has been described with respect to a preferred embodiment, it will be apparent to those skilled in the art that various implementation of the invention may be envisioned that would relocate the functional capacities of the CLM 2, the LCSM 3, the LCCM 4 and the various LCCs 10 without departing from the spirit and scope of the invention. Therefore, what is described and what is intended to be protected by Letters Patent is set forth in the claims which follow by way of example only and not as limitation.

We claim:

1. A method for problem determination and automatic non-disruptive recovery of communication link problems between a using node and a remote node in a data communication network containing a plurality of processing systems, one of which is designated as a host system, said method comprising the steps of:

detecting a communication link problem at said using node;

accumulating link event data at said using node and passing said link event data to a communication link manager;

responsive to said link event data, sending a request from said communication link manager to a link configuration manager for link subsystem configuration data on a communication link and returning said configuration data to said communication link manager;

selecting a problem determination algorithm for the configuration returned from said link configuration manager and invoking a link connection subsystem manager for application analysis;

conducting testing of the link segment of said communication link for which said link connection subsystem manager is responsible;

determining a failed component on said communication link by said link connection subsystem manager and identifying said failed component to said communication link manager; and responsive to the receipt of said identified failed component initiating a recovery action by said communication link manager.

2. The method of claim 1 wherein the stp of detecting a communication link problem at said using node includes the steps of determining if the problem is internal to the using node, and if the problem is not internal to the using node, determining if the problem is with a link connection.

3. The method of claim 1 wherein the step of returning said configuration data to said communication link manager includes identifying a plurality of link connection components on said communication link between the using node and the remote node and a plurality of physical link connections between said link connection components, identifying the link connection subsystem manager responsible for each link connection component, and identifying a plurality of available backup components to use for non-disruptive recovery.

4. The method of claim 1 further including the step of determining if at least one more link connection subsystem manager should be invoked for application analysis.

5. The method of claim 1 wherein the step of initiating a recovery action includes determining if a recovery action is defined for the failed component, removing said failed component from said communication link and adding a backup component from said plurality of available backup components to said communication link.

6. The method of claim 5 further including updating a configuration data base maintained by the link configuration manager after said recovery action is complete.

7. The method of claim 6 wherein the step of updating the configuration data base includes flagging the failed component and identifying the backup component as a replacement on said communication link for the field component.

8. The method of claim 1 further including the steps of notifying a data link control in said using node to restart the communication link and sending a notification to the host system identifying the failed component if said recovery action is successful.

9. The method of claim 8 further including the steps of sending an alert to the host system indicating that a recovery action was attempted but failed and notifying the data link control in said using node to send an inoperative signal.

10. The method of claim 8 further including the step of interrupting said data link control at the using node in order to suspend a plurality of communication sessions occurring between the using node and the remote node until the communication link problem is isolated and resolved.

11. A system for problem determination and automatic non-disruptive recovery of communication link problems between a using node and a remote node in a data communication network comprising:
communication link manager means connected to said data communication network for coordinating a test of a plurality of link connection components on a communication link, and responsive to the test of said link connection components, analyzing the results and invoking a recovery procedure;
first means at said using node for detecting a communication link problem;
second means at said using node for accumulating link event data and passing said link event data to said communication link manager means;
link configuration manager means cooperating with said communication link manager means for maintaining a configuration data base and providing link configuration data, said link configuration data including an identity of the plurality of link connection components on said communication link and a plurality of physical connections between said link connection components, and an identity of a backup component and a physical connection to use for recovery from a communication link problem; and
a plurality of link connection subsystem manager means connected to said communication network and cooperating with said communication link manager means for conducting the test of link connection components of said communication link, identifying a failed link connection component to said communication link manager means, and issuing recovery commands for said failed link connection component.

12. The system of claim 11 including interface means at said using node for interrupting a data link control at said using node in order to suspend a plurality of communication sessions that are active over the communication link between the using node and remote node until the recovery procedure is completed.

13. The system of claim 11 wherein said communication link manager means includes means for determining the link connection subsystem manager means to invoke for testing of an assigned segment of said communication link.

14. The system of claim 11 wherein said communication link manager means includes means for selecting and invoking a recovery procedure for the failed link connection component.

15. The system of claim 11 including means at said link configuration manager for updating the configuration data base after said recovery procedure is complete.

* * * * *